June 20, 1967 — J. F. MARQUARDT — 3,326,317
FLUID POWER STEERING SYSTEM
Filed Oct. 22, 1965 — 3 Sheets-Sheet 3

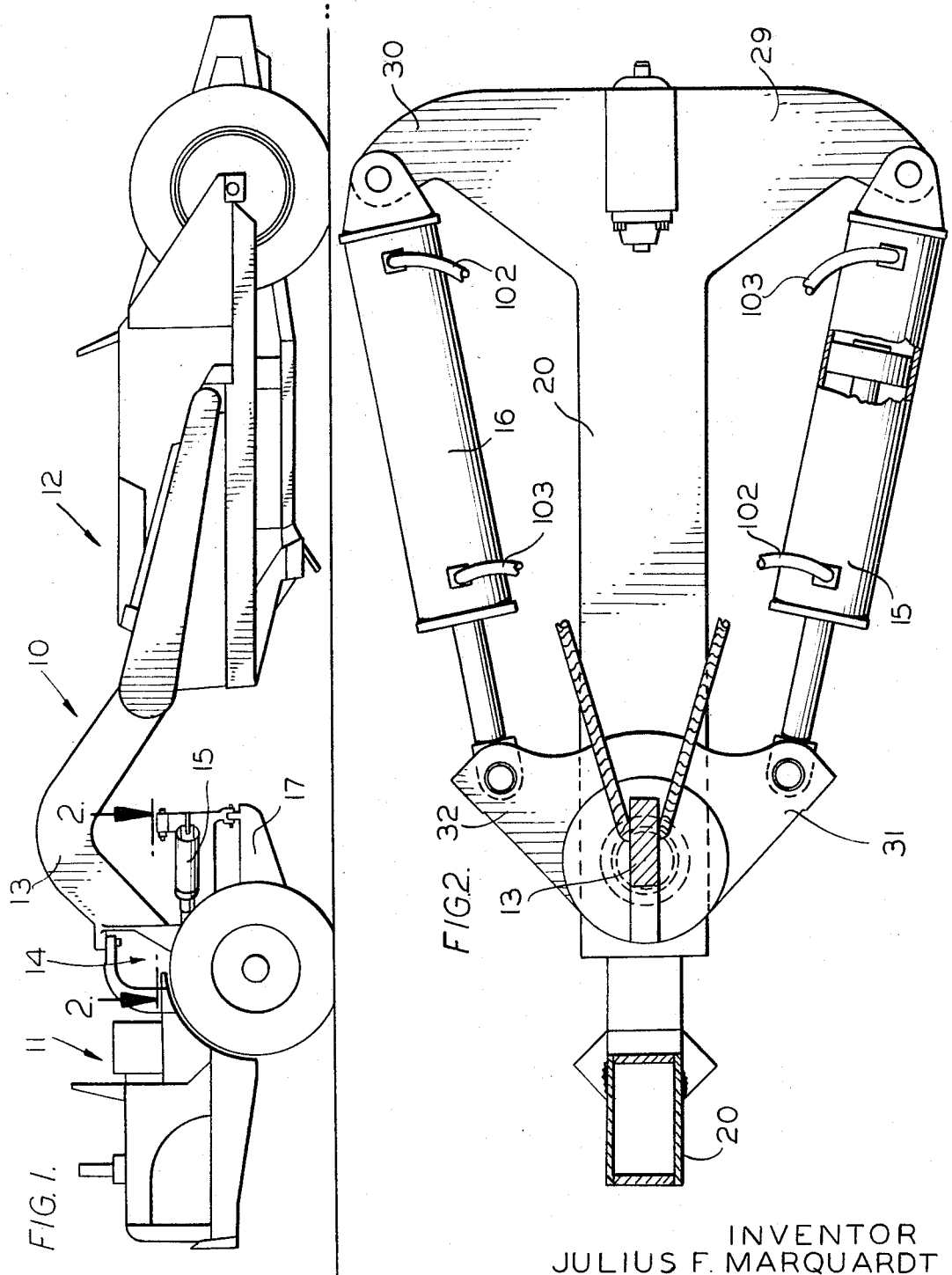

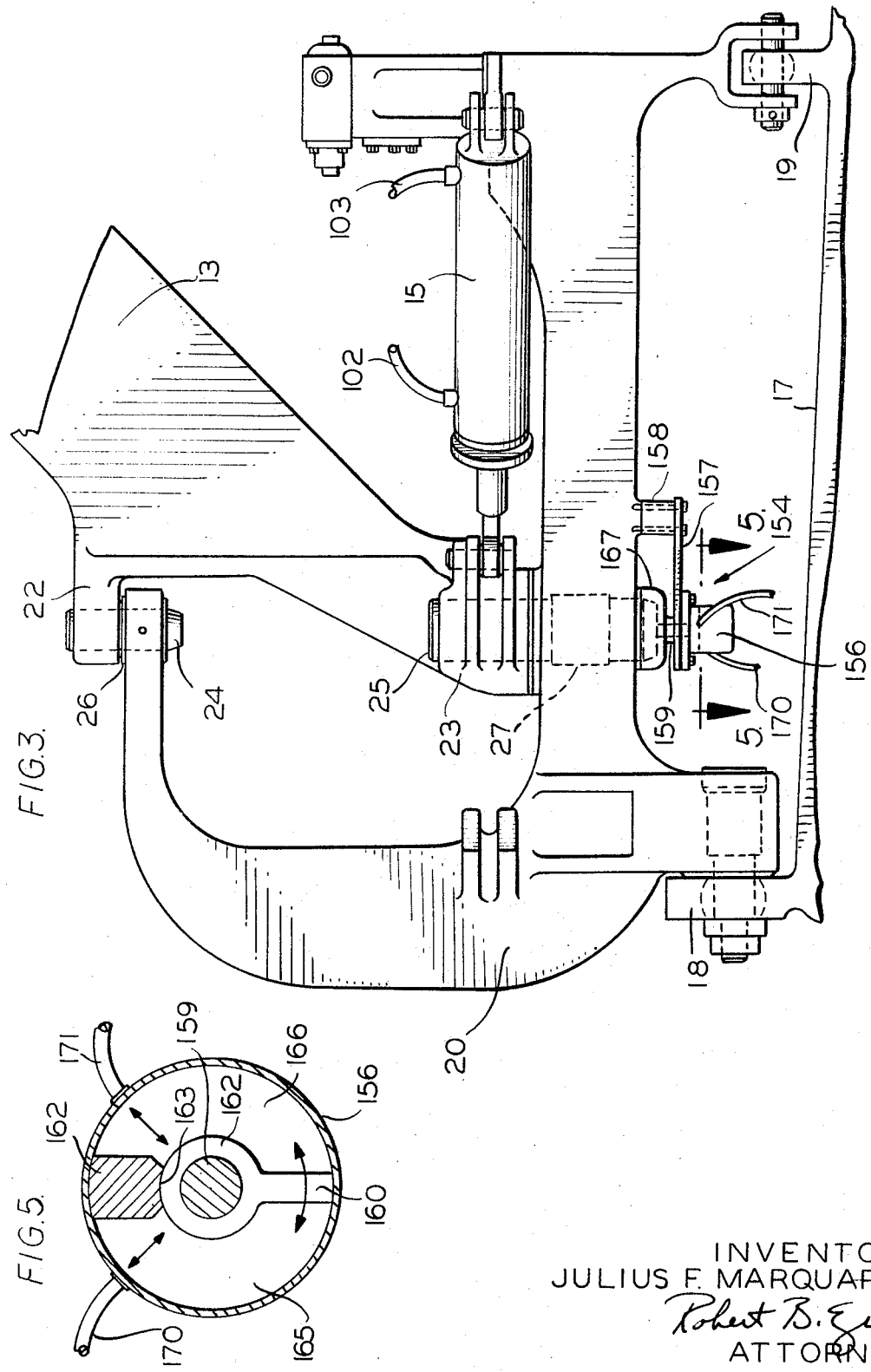

INVENTOR
JULIUS F. MARQUARDT
Robert B. Ginn
ATTORNEY

United States Patent Office 3,326,317
Patented June 20, 1967

3,326,317
FLUID POWER STEERING SYSTEM
Julius F. Marquardt, Westchester, Ill., assignor to International Harvester Company, Chicago, Ill., a corporation of Delaware
Filed Oct. 22, 1965, Ser. No. 500,724
7 Claims. (Cl. 180—79.2)

This invention relates to a fluid power steering system, and more particularly, to an improved hydraulic steering system for a vehicle, having a control circuit which provides an accurate relationship between the desired steering movement selected by the operator, and the actual vehicular steering movement.

In prior known power steering systems of this general type, a control valve is provided for selectively porting fluid to hydraulic actuators connected to effect the desired steering movement of the vehicle. In these prior devices a steering position sensing device has been employed to sense the degree of steering movement, and to supply a quantity of fluid to the control valve to reposition it in conventional feedback fashion. However, all of the known hydraulic feedback devices require rather complex mechanical elements to achieve even some degree of linearity between the angle of turn and the volume of fluid (the hydraulic signal), delivered by the feedback device to the control valve. In some of these prior devices it was possible only to achieve a very limited linear relationship between these parameters, that is, they provided a linear output or sensitivity only over less than 60 degrees of steering or turning movement. In these prior control systems, the vehicle was either prevented from exceeding a 60 degree steering angle, or if permitted to exceed 60 degrees provided extremely erratic and unproportional steering control.

It is therefore a primary object of the present invention to provide a new and improved fluid power steering system for a vehicle which provides a linear relationship between the actual vehicle position and the sensed vehicle position over a greater turning angle than heretofore known in the prior art.

It is another object of the present invention to provide a new and improved hydraulic power steering system of the type described including a hydraulic fluid displacement device for sensing the steered position of a vehicle of a simpler and more economical construction than prior known sensing devices.

It is a further object of the present invention to provide a new and improved fluid power steering system for an articulated vehicle of the type having a control valve for porting fluid selectively to fluid actuators, connected to effect steering movement of the vehicle with a new and improved rotary hydraulic device for sensing the degree of steering which gives true linear sensing over any angular range up to 280 degrees.

A more specific object of the present invention is to provide a new and improved power steering system for an articulated two wheel tractor and trailer, in which the trailer is pivotally mounted to the tractor frame about a generally vertical axis, with a first member connected to the tractor frame, and a second member adapted to be carried by the trailer, with the second member having a pivotal pin rotatably mounted in the first member about a generally vertical axis, having a pair of reciprocating hydraulic actuators mounted on the first member and drivingly connected to the second member to pivot the tractor relative to the trailer to effect vehicular steering movement, with a steering control valve for selectively porting fluid from a pressure source to the hydraulic actuators to control the power assisted movement thereof; the control valve having a movable spool member initially positioned by an operator controlled steering pump, in accordance with the desired steering movement of the vehicle, with feedback means for assisting in the return of the movable valve member to a neutral position, so that the operator selected degree of steer is maintained; the feedback means or device including a rotary vane hydraulic displacement device concentric with the pivotal axis of the tractor and trailer, connected to be driven by the trailer, having a generally cylindrical casing surrounding a portion of the shaft and fixed to the tractor so that it moves therewith, the casing having a partition disposed therein and defining two chambers with the vane so that upon rotation of the tractor with respect to the trailer, the vane on the shaft will displace fluid within the chambers in exact accordance with the angular movement of the tractor with respect to the trailer, the chambers in the casing being connected to the control valve so that the fluid displaced therefrom is delivered to the control valve to reposition it in exact accordance with the degree of vehicular steering movement.

Other objects and features of this invention will be apparent on a perusal of the following specification and drawings in which:

FIG. 1 is an elevation view of a two wheeled earth moving vehicle incorporating the principles of the present invention;

FIG. 2 is a top elevational fragmentary view, partially in cross section, taken generally along line 2—2 of FIG. 1 showing the hydraulic actuators for pivoting the tractor with respect to the trailer;

FIG. 3 is a side elevation of the pivotal coupling between the tractor and the trailer illustrating the hydraulic steering actuators, and the hydraulic displacement feedback device;

FIG. 5 is a cross section taken generally along line 4—4 in FIG. 3 showing the rotary hydraulic feedback displacement device.

Figure 4:
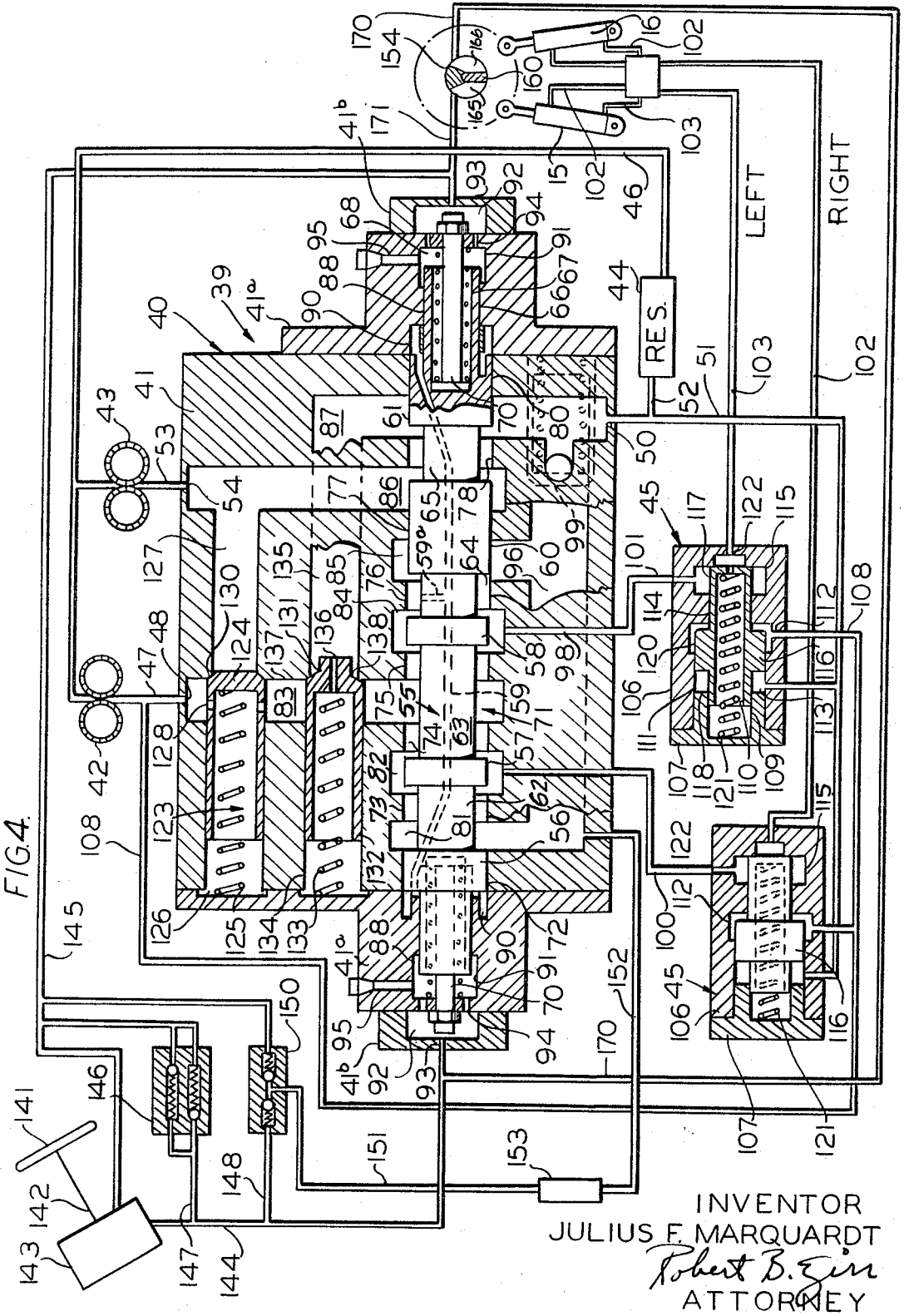
FIG. 4 is a schematic illustration of the power assist steering control system.

The present embodiment is the preferred embodiment but it should be understood that changes can be made in the present embodiment by one skilled in the art without departing from the spirit or scope of the present invention.

Referring now to the drawings and particularly FIG. 1 thereof, an earth moving tractor and trailer 10 is seen to include a two wheeled tractor 11, with a scraper 12 propelled thereby. As will be apparent to those skilled in this art, the scraper 12 has a gooseneck 13, extending from the forward end thereof which is pivotally connected to the tractor as illustrated at 14 in FIG. 1. Hydraulic actuators 15 and 16, as shown more clearly in FIG. 2, are connected to pivot the gooseneck 13 with respect to the tractor 11 to effect the steering movement of the vehicle.

Referring to the mechanical elements of the steering mechanism in more detail, and with reference to FIGS. 2 and 3, the rearward portion of the tractor frame 17 is seen to have spaced aligned upwardly extending bosses 18 and 19, which pivotally support a yoke member 20 for movement about a horizontal axis extending longitudinally of the vehicle. The pivotal mounting of the yoke 20 permits some pivotal movement of the scraper 12 with respect to the tractor about a longitudinal axis. For purposes of the steering system, the yoke 20 should be considered part of the tractor frame 17.

The forward end of the gooseneck 13 has bosses 22 and 23 which have pins 24 and 25 press fitted therein, and rotatably supported in axially aligned bearings 26 and 27 in the yoke 20.

As shown more clearly in FIG. 2, the yoke 20 has transversely extending arms 29 and 30 which pivotally support one end of the hydraulic cylinders 15 and 16. Piston rods associated with the cylinders 15 and 16 are pivotally fixed at their extending ends to bifurcate transversely extending projections 31 and 32 forming a part of the gooseneck 13.

To effect leftward turning movement of the vehicle, the actuator 15 is extended while the actuator 16 is retracted. To effect rightward turning movement of the vehicle, the actuator 16 is extended and the actuator 15 is retracted. Both actuators are driven by hydraulic fluid under pressure from a hydraulic circuit described in detail with reference to FIG. 4.

For the purpose of sensing the actual degree of turn of the vehicle, and for feeding back a hydraulic signal proportional thereto to the control circuit, a rotary hydraulic servo-pump 154 is provided, driven by the lower pin 25. The servo 154 will be described in more detail below, and it is sufficient to say at this time that upon steering movement of the vehicle in one direction, fluid will be ported from conduit 170 in proportion to the angular degree of turn from the straight ahead position, and upon steering movement of the vehicle in the other direction, fluid will be ported from conduit 171 in proportion to the degree of turn in that direction.

The hydraulic circuit 39, best shown in FIG. 4, supplies hydraulic fluid under pressure to the actuators 15 and 16 for power steering of the vehicle through a working circuit and a control circuit. Considering firstly the working circuit, which comprises a control valve 40 consisting of a central body portion 41, intermediate cap portions 41a and outermost cap portions 41b, primary and secondary pump sources 42 and 43, a reservoir 44 and two load valve means 45 disposed between the control valve 40 and the actuators 31. A suction conduit 46 connected at one end to the reservoir 44 delivers fluid from the reservoir 44 to the primary and secondary pumps 42 and 43 through a parallel connection at the other end of the suction conduit 46. A supply conduit 47 delivers fluid under pressure from the primary pump 42 to the primary inlet port 48 in the control valve 40. Similarly supply conduit 53 connected at one end to the secondary pump delivers fluid under pressure therefrom to the secondary inlet port 54 of the control valve 40. Fluid from the control valve 40 is returned to the reservoir 44 through a discharge port 50 connected to a return conduit 51 also connected in parallel at the other end to the discharge ports of the load valve means 45. Intermediate the ends of the return conduit 51 a conduit 52 is directly connected to the reservoir 44.

A movable valve member or plunger 55 is provided within the control valve 40 and comprises a series of annular lands 56, 57, 58, 60 and 61 interconnected by a series of reduced portions or annular recesses 62, 63, 64 and 65. It is to be noted here that the annular land 60 is of greater length than any annular land on the valve member 55 and that the outermost lands 56 and 61 are identical and the other two annular lands 57 and 58 are also identical but the smallest in length. The outermost ends 66 of the valve member 55 provide a pair of identical closed end bores 67 for the assembly therein of a centering spring 68 and a pin means 70. The pin means includes an enlarged or piston-head end at one end and a threaded end for an engaging nut at the other end to engage a surface of the intermediate portion 41a adjacent the cap portion 41b, to be later further described. The two centering springs 68 and pin means 70 cooperate to urge the valve member 55 to a neutral position such as shown in FIG. 4.

A bored opening through the body portion 41 of the control valve is provided for the operation of the valve member 55 and comprises a series of annular lands 72, 73, 74, 75, 76, 77, 78 and 80 interconnected by a series of annular recesses 81, 82, 83, 84, 85, 86 and 87. It is to be noted here that the annular recesses 81, 83, 86, and 87 extend beyond the bore 71 to connect with passageways or ports within the valve body portion 41 to be later described. Further extension of the bore 71 is provided within the two intermediate valve body portions 41a through annular recess 90 and 91 interconnected by an annular land 88 engaging the outermost ends 66 of the valve member 55. It is to be noted that the annular recess 90 within the intermediate body portion 41a provides extension of the outermost annular lands 72 and 80 within the central valve body portion 41 of the bore opening 71.

The outermost portions 41b of the control valve 40 provide a chamber 92 that forms part of the servo-motor of the control circuit such that the chamber 92 is connected at one end to an inlet port 93 and through a series of openings 94 at the other end is communicatively connected to the annular recess 91 and closed end bore 67 of the movable valve member 55.

A passageway 95 connected at one end to the annular recess 91 and at the other end closed by a plug not indicated is for the purpose of bleeding the pressure fluid within the control circuit to remove the presence of air or other gaseous fluids.

To prevent fluid pressure build-up, due to leakage, between the valve member outermost annular lands 56 and 61 within the two annular recesses 90 extending the bored opening 71 into the intermediate portions 41a an internal relief passageway 59 within the valve member 55 is provided communicatively connected at either end to the annular recesses 90 of the bored opening 71. Intermediate the ends of the internal passageway 59 a radial passageway 59a is provided within the valve member 55 at the annular recess adjacent the discharge passage 85 to equalize the fluid pressures within the annular recess 90 so as to prevent hydraulic locking of the valve member 55. The size of the internal relief passage 59 and 59a can be adjusted to provide a throttling effect on fluid flowing from recesses 90 thereby giving a cushioning or dashpot action to prevent flutter of valve member 55.

A discharge passageway 96 within the central valve portion 41 communicatively connects with the annular recesses 81 and 85 of the bored opening 71 and also communicatively connects with the passageway defined by the extension of the annular recess 87 connected at one end to a discharge port through a normally closed check valve 99. The spring biased check valve 99 is of conventional construction such that pressure fluid within the passageway 96 does not communicatively connect to the discharge port 50 unless a sufficient pressure fluid acts upon the check valve 99 to exceed the predetermined spring value. One of the purposes of the check valve 99 is to maintain a predetermined pressure on the sources of fluid under pressure in the passageway 96 to thereby maintain a predetermined static fluid pressure in the control circuit. The passageway 96 at one end is connected to the control circuit to be later described. A sufficient spring value of the check valve 99 to provide sufficient control circuit static fluid pressure for one reduction to practice corresponds to a fluid pressure of 30 p.s.i.

A first outlet port or passageway 97 connected at one end to the annular recess 82 is connected at the other end to a conduit 100 connected to the first load valve means 45. Similarly, a second outlet port or passageway 98 connected at one end to the annular recess 84 is connected at the other end to a conduit 101 connected to the second load valve means 45. The first load valve means 45 through a conduit 102 is parallel connected to opposite ends of the actuators 15 and 16 such that if pressure fluid under pressure appears in conduit 102 the vehicle will be steered to the right. Similarly, the second load valve means 45 through a conduit 103 is parallel connected to the remaining opposite ends of the actuators 15 and 16 such that if pressure fluid under pressure appears in the conduit 103 the vehicle will be steered to the left. It is to be noted here in FIG. 4 that the vehicle is positioned in the straight forward position.

Since both load valve means 45 are of identical internal construction and further for the purpose of brevity, only the second load valve means 45 has been indicated by reference numbers referring to the internal details inclusively. Specifically, a main body portion 106 of the load valve means 45 provides a closed end bore therein having bore surfaces 111 and 115 interconnected by an annular recess 112 and an annular land 114. One end of the bore surface 111 not connected to the annular recess 112 is closed by a cap portion 107 having a bore 109 closed at one end and connected at the other end to an annular surface 113 of the cap portion 107. A spring biased valve member or plunger 116 is slidable within the closed bore defined by the portions 106 and 107, and includes reduced portions 117 and 118 interconnected by an annular land 120. Further, during slidable movement of the valve member 116 the reduced porion 118 slidingly engages the closed end bore 109 and the other reduced porion 117 slidingly engages the annular land 114 of the main portion 106 while the annular land 120 of the valve plunger 116 slidingly engages the bore surface 111. A spring 121 engages at one end the closed end of the bore 109 and at the other end engages the closed end of a smaller bore within the valve plunger 116 so as to urge the valve plunger 116 to a closed position against the shoulder interconnecting bore surface 115 and an outlet passageway 122 connected to the conduit 103. To prevent hydraulic locking of the valve plunger 116 within the load valve means 45 a bleed passageway of conventional construction is provided at the closed end of the bore within the valve plunger 116 communicatively connecting the outlet passageway 122 and the two bores assembling the spring 121. Similarly, the first load valve means 45 has its valve plunger 116 in the spring biased closed position against the shoulder interconnecting the bore surface 115 and passageway 122 connected to the conduit 102. Although not shown in the drawings, the two load valve means 45 could be secured to the actuators 15 and 16 as one suitable design location.

Pressure fluid under pressure in either first or second outlet conduits 100 and 101 are communicatively connected respectively to the conduits 102 and 103 when pressure fluid of a sufficient pressure appears in the annular recess 112 of both load valve means to urge the spring biased valve plunger 116 to an open position. To provide pressure fluid of sufficient pressure within the annular recess 112 a conduit 108 is connected at one end to the primary supply conduit 47 and parallel connected at the other end to the annular recesses 112 within both load valve means 45. Thus when pressure fluid of sufficient pressure appears in conduit 108 the load valve means 116 are opened to open position to communicatively connect respectively conduits 100 and 102, and conduits 101 and 103. In one reduction to practice a spring 121 having a predetermined value corresponding to the fluid pressure range of 275 to 400 p.s.i. was found to be suitable for operation of the load valve means 45. The purpose of the load valve means 45 is to provide a predetermined resistance to external forces in the neutral position of the valve member 55 to prevent steering wander or excessive impacts on the construction of the hydraulic circuit 39. Another purpose of the load valve means 45 is to assure steering of the vehicle in any one selected direction, such as the straightforward direction shown in FIG. 4.

In view of the afore description of the working circuit components of the hydraulic circuit 39 an operation of these components together will now be described below. With the valve member 55 of the control valve in the center or neutral position as shown in FIG. 4 pressure fluid from the primary pump 42 is directed through conduit 47, annular recess 83 including its extended passageway to the bore 71, then communicatively connected to both first and second outlet ports 97 and 98, then to discharge passageway 96 through the bore annular recesses 81 and 85 to the closed check valve 99. During the neutral position of the valve member 55 the pressure fluid under pressure in conduit 108 is not sufficient to open the valve plunger 116 in both load valve means 45, but the pressure fluid under pressure in the discharge passageway 96 is sufficient to open the normally closed check valve 99 so as to communicatively connect the discharge passageway 96 with the reservoir 44 through the discharge port 50 and connecting conduits 51 and 52. During the neutral position of the valve plunger of the valve member 55 the secondary source of pressure fluid from pump 43 is communicatively connected to the reservoir 44 through conduit 53, inlet port 54 and annular recess 86 including its extended passageway to annular recess 87 through annular land 78 to the discharge port 50 and conduits 51 and 52. Thus during the neutral position of the valve member 55 the primary pump 42 is communicatively connected through the valve member 55 to the discharge passageway 96, then to the reservoir 44 through the check valve 99, and the secondary fluid pressure pump 43 is communicatively connected to the reservoir 44 through the inlet port 54 to the discharge port 50 through passageways 86 and 87.

If the valve member 55 is moved by the control circuit to the left, the first right steering position, valve member lands 57 and 58 respectively engage bore lands 73 and 75 to direct pressure fluid from the primary pump 42 through passageway 83 to annular recess 82 to communicatively connect with the first load valve means 45 through first outlet port 97 and conduit 100, while the second load valve means 45 through conduit 101 is communicatively connected to the reservoir 44 through annular recess 84 communicatively connected to annular recess 85 to connect with discharge passageway 96, check valve 99 and conduits 51 and 52. It is to be noted here that the longitudinal length of valve member land 60 while the valve member 55 is in the first right steering position is not sufficient to prevent communicative connection between bore annular recesses 84 and 85.

Assuming that the valve member 55 has returned to the neutral position and the rate of steering movement has sufficiently increased as indicated by the control circuit the valve member 55 is moved further to the left to the second right steering position such that valve member annular lands 57, 58, 60 and 61 respectively engage bore annular lands 73, 75, 77 and 78. In the second left position of the valve member 55 for right steering movement of the vehicle pressure fluid under pressure from the primary pump 42 and the secondary pump 43 are combined in the passageway 83 to communicatively connect with the first load valve means 45 through conduit 100, first outlet port 97 and communicatively connected bore annular recesses 82 and 83. During the second left position of the valve member 55 the second load valve means 45 is communicatively connected to the reservoir 44 through conduit 101, second port 98, communicatively connected annular recesses 84 and 85 to conduits 51 and 52 through discharge passageway 96 and check valve 99. Also during the second left position of the valve member 55 annular land 61 engaging annular land 78 prevents communication between passageways 86 and 87 such that the secondary source of pressure fluid under pressure now has sufficient pressure in passageway 127 to unseat an unloading valve 123 to combine the flow with the primary pump 42 in passageway 83.

Although not heretofore mentioned in detail, the unloading valve 123 comprises a valve member 124 slidable in a bore 126 closed at one end by the left intermediate body portion 41a. It is to be noted here that the passageway 127 is of less diameter than the closed end bore 126. The valve member 124 provides a closed end bore for assembly of a coil spring 125 engaging at its opposite ends the bore 126 and the valve member bore. To prevent hydraulic locking of the unloading valve 124 and supply pressure from the passageway 83 for differential area operation a passageway 128 is provided. As shown in FIG. 4 the unloading valve is in the normally closed position engaging the beveled seat portion 130 between passageways 83 and 127. Thus whenever passageway 86 is prevented from connecting with passageway 87 by movement of the valve member 55, the secondary pressure fluid under pressure in passageway 86 is sufficient to open the unloading valve 124 and thereby combine the pressure fluid of the primary and secondary pumps 42 and 43.

While the valve member 55 is in a first or second left position for right steering movement of the vehicle pressure fluid under pressure in conduit 108 in parallel connection to both load valve means develops sufficient pressure within load valve annular recesses 112 to urge the spring biased valve plungers 116 to the open position to thereby communicatively connect respectively conduits 100 and 102 and conduits 101 and 103. Since pressure fluid under pressure appears in conduit 100 the actuators 15 and 16 cause movement of the gooseneck 13 about pivot bearings 26 and 27 with respect to the yoke 20 for steering movement to the right, namely, the counter-clockwise direction of gooseneck 13 with respect to yoke 20 as viewed in FIG. 2. Simultaneously with movement of the actuators 15 and 16 fluid in conduit 103 is returned to the reservoir 44 through conduits 101, communicatively connected recesses 84 and 85, discharge passageway 96, check valve 99, discharge port 50 and connected conduits 51 and 52 to the reservoir 44. Upon return movement of the valve member 55 to the neutral position from the first or second left position for right steering movement both load valve means 45 will be urged to the closed position by spring biased valve member 116 since in the neutral position there is not sufficient pressure of the pressure fluid in conduit 108 to urge the spring biased valve members 116 to the open position for communicatively connecting conduits 100 and 102, and 101 and 103.

If the valve member 55 from the neutral position shown in FIG. 4 is moved to the right, the first left steering position, by the control circuit such that the valve member lands 82 and 84 engage respectively bore lands 74 and 76 while annular land 60 is not of sufficient length in the first right position to engage bore annular land 78 so as to prevent communication between passageways 86 and 87. In the first right position pressure fluid under pressure from the primary pump 42 is directed to the second load valve means 45 and conduit 101 through passageway 83 communicatively connected annular recess 84 to second outlet port 98. The first load valve means 45 and its conduit 100 are directly connected to the reservoir 44 in the first right position of the valve member 55 through first port 97, communicatively connected recesses 81 and 82, discharge passageway 96, check valve 99, discharge port 50 and connected conduits 51 and 52.

Assuming that the valve member is further moved from the neutral position 55 shown in FIG. 4 to the right to the second left steering position by the control circuit indicating an increased rate of steering movement, the passageway 83 remains communicatively connected to the second load valve means 45 and conduit 101 through communicatively connected recess 84 and second port 98. Further, the first load valve means 45 and its conduit 100 remains directly connected to the reservoir 44 through communicatively connected recesses 81 and 82, discharge passageway 96, check valve 99, discharge port 50 and connected conduits 51 and 52. However, during the second right position valve member land 60 engages bore annular land 78 while still engaging bore annular land 77 to prevent communicative connection with passageways 86 and 87 to thereby increase the pressure of the secondary pressure fluid under pressure in passageways 86 and 87 sufficiently to open the unloading valve 123 to combine the flow of the primary and secondary pumps 42 and 43 to thereby increase the rate of steering movement of the tractor 11 with respect to the trailer 12.

While the valve member 55 is in a first or second right position for left steering movement of the vehicle pressure fluid under pressure in conduit 108 in parallel connection to both load valve means 45 develops sufficient pressure within load valve annular recesses 112 to urge the valve members 116 to the open position to thereby communicatively connect respectively conduits 101 and 103, 100 and 102. It is to be pointed out, however, that in either the first or second right position pressure fluid under pressure appears in conduit 103 to now move the actuators 15 and 16 in the opposite direction to steer the gooseneck 13 about bearings 26 and 27 counter-clockwise relative to the yoke 20 to effect left vehicular steering. As should now be readily apparent return pressure fluid from the actuators 15 and 16 is directed through conduit 102 to the reservoir 44 through conduit 100 and communicatively connected recesses 81 and 82.

In order to prevent excessive pressures within the hydraulic circuit 39 a relief valve means 131 is provided. Specifically, the relief valve means 131 comprises a valve plunger 132 slidable in a closed bore 134 and urged to a closed position by a coiled spring 133 engaging at its ends the closed end of bore 134 and of the valve plunger bore. In the closed position an inclined surface 138 on the valve plunger 132 engages an annular shoulder 137 between passageways 135 and 83 to prevent fluid communication therebetween. A bleed passageway 136 connects passageway 135 with the closed end bore 134, the purpose of which is to prevent hydraulic locking of the relief valve plunger 131. Whenever an excessive pressure occurs in the passageway 83 irrespective of combined flow of the primary and secondary pumps 42 and 43 or just the flow of the primary pump 42 the relief valve plunger 131 is moved to open position against its spring 133 to communicatively connect passageways 83 and 135 so that the relieved pressure fluid is directed to the reservoir 44 through passageway 87, discharge port 50 to connected conduits 51 and 52. It is to be further noted that the passage way 135 is of smaller diameter than the closed end bore 134.

In view of the aforedescribed description of the working circuit of the hydraulic circuit 39 a description of the control circuit thereof will now be set forth. The control circuit comprises a steering wheel 141 on a steering shaft 142 operatively connected to a steering pump 143 of conventional construction. The steering pump 143 includes conduits 144 and 145 connected to the passageways 93 on the outermost body portions 41b of the control valve 40. It is to be pointed out here that the control circuit is normally static and that movement of the steering wheel 141 by the operator within the operator's cab 11 displaces fluid in conduits 144 and 145. In the event that excessive pressure occurs in one of the conduits 144 and 145 an opposed check valve 146 comprising two check valve means as shown in FIG. 4 is connected across conduits 144 and 145 by a conduit 147 to relieve the excessive pressure that may occur in conduits 144 and 145. The control circuit is maintained under a predetermined static pressure since the check valve 99 as aforedescribed maintains a predetermined pressure for the pressure fluid in the discharge passageway 96. The pressure fluid in passageway 96 is connected to the control circuit portion through conduits 151 and 152. A pressure fluid operated check valve 150 is also connected across conduits 144 and 145 by conduit 148. Further, the check valve 150 is also connected to the central body portion 41 of the control valve 40 to the discharge passageway 96 by conduits 151 and 152. Thus if any dropoff in pressure fluid occurs in the control circuit the pressure fluid operated check valve 150 is urged to the opened position by the pressure fluid in conduits 151 and 152 to increase pressure fluid in the control circuit to the normal supply and normal static pressure. To assure that supplied pressure fluid in conduit 151 is free of any foreign elements a filter 153 of conventional construction is provided and interposed between conduits 151 and 152.

In order to move the valve plunger 55 from the neutral position to the first or second left position, the operator moves the steering wheel 141 in one direction to cause movement of pressure fluid from conduit 144 to conduit 145 to thereby move pressure fluid into the right servo-motor chamber 92 communicatively connected to annular recess 91 through passageways 94 as aforedescribed. Then the moved pressure fluid acts upon the outermost right end of the valve member 55 in FIG. 4 to move it to the left. Simultaneously with movement of the valve member 55 to the left the left pin means 70 in the left servo-motor 92 in FIG. 4 is moved to the left against the action of the centering spring 68.

When the operator moves the steering wheel 141 in the opposite direction pressure fluid in conduit 145 is moved by pump 143 to conduit 144 and the left servo-motor chamber 92 communicatively connected to the annular recess 91 by passageway 94. Assuming that the valve member is in a neutral position the moved pressure fluid acting upon the left outermost annular end of the valve member 55 moves the valve member 55 to the first or second right position. During this rightward movement of the valve member 55 the right pin means 70 is moved to the right against the action of its centering spring 68.

It should now be noted that when the left or right servo-motor chambers 92 are actuated by movement of the pressure fluid in the static control circuit there is sufficient spacing allowed in the servo-motor chambers 92 for movement of the pin means 70 against the action of the centering spring 68. Further, the adjustment of the nut on the threaded end of the pin means 70 provides the proper centering and corresponding neutral position of the valve member 55 in the control valve 40.

The control circuit, in combination with the servo-motors 92, and the steering pump 143, along with the servo-pump or sensing means 154, provide an accurate servo-mechanism with follow-up for vehicular steering. Referring now to FIGS. 2, 3, and 5, wherein the rotary servo-pump 154 is shown in more detail, it is seen to consist of a generally cylindrical casing 156 having a closed lower end. The casing 156 is fixed to the yoke 20 by means of a bracket assembly 157 and suitable fasteners 158. As shown more clearly in FIG. 5 the casing 156 has a centrally disposed shaft 159 rotatable therein. Rotatable with the shaft 159 is a radial vane 160 extending from a cylindrical hub 162 fixed to the shaft 159. A partition 162 is fixed within the casing 156, and has a generally arcuate surface 163 slidably and sealingly engaging hub 162. It may thus be seen that the partition 162 and the rotatable vane 160 divide the interior of the casing 156 into hydraulic chambers 165 and 166.

The servo-pump shaft 159 is adapted to be driven by the gooseneck 13 in the following manner:

Shaft 159 extends upwardly from the casing 156 through a cap 167 covering the lower end of the pin 25. Splines (not shown) are formed on the end of shaft 159, and interengage with mating splines (not shown) formed in a central bore in the lower end of the pin 25, which as noted above is press-fitted within and carried by the gooseneck 13.

In this manner, the casing 156 is carried by the tractor 11 while the rotary vane 160 is carried and driven by the gooseneck 13, so that upon angular displacement of the tractor 11 with respect to the trailer or scraper 12, the vane 160 will be rotated within the casing 156 to port fluid through one of the conduits 170 or 171. The vane 160 is arranged so that during straight ahead movement of the vehicle, the vane will assume its position shown in FIG. 4 and 5 where it divides chambers 165 and 166 into equal volumetric displacements. It may be seen from FIG. 5 that the vane 160 is permitted a full 280 degrees of rotation within the casing 156, limited from 360 degree movement only by the partition 162 which acts as a stop. With the vane 160 in the position shown in FIG. 5 taken as a straight ahead reference position, it may be seen that the vane may rotate in either direction from this reference 140 degrees. Thus, the servo-pump 154 is capable of accurately sensing steering movements of the vehicle up to 140 degrees in either direction from the straight ahead position. Exact linearity is achieved between the degree of turn and the fluid displaced through conduits 170 and 171, due to the fact that vane 160 displaces fluid from the chambers 165 and 166 in proportion to the angular relationship between shaft 159 and casing 156. This gives the present hydraulic servo-pump or sensing means 154 true linearity over a 280 degree range of steering movement.

Since the purpose of the rotary servo-pump 154 is to provide "road feel" within the control circuit, so that when the operator moves the steering wheel 141 in one direction to move the valve member 55 to the left for right steering movement of the vehicle, the servo-pump vane 160 will rotate counter-clockwise with respect to the casing 156, and fluid will be ported through conduit 170 connected with the left servo-motor 92 to oppose actuation of the valve member 55 to the left position, and thereby provide "road feel" to the operator in moving the steering wheel 141. Similarly, when the operator moves the steering wheel 141 in the other direction, pressure fluid in conduit 144 is moved to actuate the valve member 55 to the right. Upon rightward movement of the valve member 55, the vehicle will be moved in leftward steering movement resulting in rotation of the vane 160 clockwise, with respect to the casing reducing the volume of chamber 165 and porting fluid through conduit 171 to actuate the right servo-motor 92 to oppose the rightward movement of the valve member 55. Thus, for right or left steering movement of the vehicle, the rotary servo-pump 154 is actuated to actuate one of the servo-motors 92 to oppose, respectively, the rightward or leftward movement of the valve 55 to urge the valve member to the neutral position when the desired degree of turn equals the actual degree of vehicular turn over a full 280 degrees of angular movement.

The volumetric displacement of the rotary servo-pump 154 and the two servo-motors 92 are selected with that of the steering displacement pump 143, so that for each degree the steering wheel 141 is rotated, a corresponding angular displacement of the tractor 11, with respect to the trailer 12, will be effected about the axis of pins 25 and 26.

In view of the aforementioned description of the details of the present invention a brief summary of the operation of the fluid power steering system will now be set forth below. Assuming that the tractor 11 and trailer 12 are aligned in a straightforward position the valve member 55 of the control valve 40 is in the neutral position such that pressure fluid from the primary pump 42 is directed through the bore 71 to the reservoir 44 through the fluid pressure opened check valve 99. With the valve member 55 in the neutral position the pressure fluid under pressure in conduit 108 is not sufficient to open spring biased valve member 116 in the load valve means to communicatively connect respectively conduits 100 and 102, and 101 and 103.

If the operator moves the steering wheel 141 at a normal rate of steering movement in one direction the valve member 55 will be moved to the first left position connecting the primary pump 42 to the first load valve means 45 communicatively connecting conduits 100 and 102 to the actuators 15 and 16 for right power steering movement of the vehicle. If the operator further increases the rate of steering movement of the steering wheel 141 the valve member 55 is moved to the second left position so as to communicatively connect the secondary pump 43 in combined flow with the primary pump 42 through the opened unloading valve 123. While the valve member 55 is in a first or second left position the second load valve means 45 communicatively connects conduits 103 and 101 directly to the reservoir 44 through the annular recesses 84 and 85 to the discharge passageway 96 and discharge port 50 for the return fluid from the actuators 15 and 16.

Assuming that the valve member 55 has returned again to the neutral position as shown in FIG. 4 and further that the operator moves the steering wheel at a normal steering rate in the other direction the valve member 55 is moved to the right by the left servo-motor 92 to communicatively connect the primary pump 42 with the second load valve means 45 and thereby communicatively connect conduits 101 and 103 with pressure fluid under pressure to actuate the actuators 15 and 16 in the other direction to steeringly move the vehicle in the leftward direction about the steering axis. If the operator increases the rate of steering movement of the steering wheel 141 the valve member 55 is moved to the second rightward position to thereby combine the flow of the secondary and primary pumps 43 and 42 through the opened unloading valve 123 to communicatively connect conduits 101 and 103 through the opened second unloading valve 45 to steer the vehicle at the increased rate to the left. It should now be readily apparent that when the valve member 55 is moved to the right the first load valve means 45 communicatively connects conduits 100 and 102 for their flow of return pressure fluid from the actuators to be returned directly to the reservoir 44 through the communicatively connected annular recesses 81 and 82.

When the operator is maintaining a selected steering direction, such as the forward steering direction in FIG. 4 thereby not moving the steering wheel 141, and the wheels strike an obstruction the normally closed load valve means 45 are not opened to communicatively connect conduits 100 and 102, and 101 and 103. Assuming that a sufficient obstruction strikes the wheels to open the load valve means 45 against their biasing springs 121, the rotary servo-pump 154 would immediately respond to the obstructive steering movement and correspondingly move the control valve member 55 in the same manner left or right to correct for the obstructive steering movement. Thus the servo-pump 154 further functions to provide corrective action or "road feel" for the operator whenever an obstruction occurs to open the closed load valve means 45. Further, during any operation of the hydraulic circuit 39, the check valve 99 assures a predetermined static fluid pressure to be maintained in the control circuit portion through the fluid operated check valve 150 connected to conduits 151 and 152.

Having thus described an embodiment of the invention, it can now be seen that the objects of the invention have been fully achieved and it must be understood that changes and modifications may be made which do not depart from the spirit of the invention nor the scope thereof as defined in the appended claims.

I claim:

1. A fluid power steering system for a vehicle, comprising: a first member; a second member pivotal relative to said first member to effect vehicular steering; actuator means for producing said relative steering movement of said members; valve means for porting fluid to said actuator means; and feedback means to reposition said valve, said feedback means sensing the relative position of said members and producing a signal for said valve means proportional to the extent of said relative pivotal movement of said members from a reference position including means for displacing fluid in linear proportion to the movement of said members for at least 90 degrees of pivotal movement of said members from said reference position.

2. A fluid power steering system for a vehicle, comprising: a first member; a second member pivotal relative to said first member to effect vehicular steering; hydraulic actuator means for producing said relative steering movement of said members; valve means for porting fluid to said hydraulic actuator means; and feedback means to reposition said valve, said feedback means sensing the relative position of said members and producing a signal for said valve means proportional to the extent of said relative pivotal movement of said members from a reference position including means for displacing hydraulic fluid in linear proportion to the movement of said members for approximately 140 degree of pivotal movement of said members from said reference position.

3. A fluid power steering system for a vehicle, comprising: a first member; a second member pivotal relative to said first member to effect vehicular steering; hydraulic actuator means for producing said relative steering movement of said members; valve means for porting fluid to hydraulic actuator means; and feedback means to reposition said valve, said feedback means sensing the relative position of said members and producing a signal for said valve means proportional to the extent of said relative pivotal movement of said members from a reference position including a rotary hydraulic fluid displacement device connected to be driven by movement of one of said members relative to the other of said members.

4. A fluid power steering system for a vehicle, comprising: a first member; a second member pivotal relative to said first member to effect vehicular steering; hydraulic actuator means for producing said relative steering movement of said members; positionable valve means for porting fluid to said hydraulic actuator means; and feedback means for sensing the relative position of said members and producing a signal for said valve means proportional to the extent of said relative pivotal movement of said members from a reference position including a radial vane hydraulic displacement device having its axis of rotation coincident with the axis of relative rotation of said relatively pivotal members, said displacement device having a generally cylindrical casing fixed to one of said members, said displacement device having a radially extending vane rotatable in and dividing the casing into two chambers, port means in said casing communicating with each of said chambers and adapted to be connected in feedback fashion to said valve means to reposition said valve, said vane being connected to be driven by the other of said members, so that upon relative movement of said members in one direction from said reference fluid will be ported from one of said chambers and drawn into the other of said chambers, and upon relative movement of said members in the other direction from said reference fluid will be ported from the other of said chambers and drawn into said one chamber.

5. A fluid power steering system for a vehicle, comprising: a first member, a second member pivotally connected about an axis to said first member to effect steering of the vehicle; hydraulic fluid actuator means connected to produce relative pivotal movement of said members in two directions from a reference position; a positionable control valve for selectively porting fluid from a pressure source to said hydraulic actuator to control the power assisted movement thereof, said control valve including a movable valve member; manually controlled means for initially positioning said movable valve member in accordance with the desired steering movement; and feedback means for assisting in the return of the movable valve member to a neutral position to maintain the angular relationship of said members including a rotary, radial vane fluid displacement device, said displacement device having a shaft coincident with said pivotal axis and connected to be driven by one of said members, a generally cylindrical casing surrounding a portion of said shaft, said casing being fixed to the other of said members, a generally radially disposed partition in said cylindrical casing, said shaft having a hydraulic fluid displacing radial vane thereon within said casing, said vane and said partition defining two generally arcuate chambers in the casing, port means connecting each of said chambers to said control valve in follow-up fashion, so that upon movement of said one member relative to the other in one direction the vane will displace fluid from one of the chambers to assist in returning the valve from a first shifted position toward neutral, and upon movement of said one member relative to the other in the other direction the vane will displace fluid from the other chamber to assist in returning the valve from a second shifted position toward neutral.

6. A fluid power assist steering system for a two wheel tractor vehicle having a trailer pivotally connected thereto comprising: a first member adapted to be mounted on tthe tractor; a second member adapted to be carried by the trailer, said second member having a pivot pin rotatably mounted in said first member about a generally vertical axis; a pair of reciprocating hydraulic actuators mounted on said first member and drivingly connected to said second member to relatively pivot said members about the generally vertical axis to effect steering movement of the vehicle; a control valve for selectively porting fluid from a pressure source to said hydraulic actuators to control the power assisted movement thereof, said control valve including a movable valve member; manually controlled means for initially positioning said movable valve member in accordance with the desired steering movement; and feedback means for assisting in the return of the movable valve member to a neutral position to maintain the angular relationship of said members including a rotary, radial vane fluid displacement device, said displacement device having a drive shaft coincident with said axis and connected to be driven by said pin, a generally cylindrical casing surrounding a portion of said shaft and connected to said first member for movement therewith, a generally radially disposed partition in said cylindrical casing, said shaft having a hydraulic fluid displacing radial vane thereon within said casing, said vane and said partition defining two generally arcuate chambers in the casing, port means connecting each of said chambers to said control valve in follow-up fashion, so that upon movement of said one member relative to the other in one direction the vane will displace fluid from one of the chambers to assist in returning the valve from a first shifted position toward neutral, and upon movement of said one member relative to the other in the other direction the vane will displace fluid from the other chamber to assist in returning the valve from a second shifted position toward neutral.

7. A fluid power assist steering system for a two wheel tractor vehicle having a trailer pivotally connected thereto comprising: a tractor frame; a first member on said tractor frame pivotally mounted about a generally horizontal axis extending longitudinally of said tractor; a second member extending from the forward end of said trailer and having two generally aligned pivot pins rotatably supported in said first member about a generally vertical axis; a pair of reciprocating hydraulic actuators mounted on said first member and drivingly connected to said second member to pivot said members about the generally vertical axis to effect steering movement of the vehicle; a control valve for selectively porting fluid from a pressure source to said hydraulic actuator to control the power assisted movement thereof, said control valve including a movable valve member; manually controlled means for initially positioning said movable valve member in accordance with the desired steering movement; and feedback means for assisting in the return of the movable valve member to a neutral position to maintain the angular relationship of said members including a rotary, radial vane fluid displacement device, said displacement device having a drive shaft coincident with said axis and connected to be driven by one of said pins, a generally cylindrical casing surrounding a portion of said shaft and connected to said first member for movement therewith, a generally radially disposed partition in said cylindrical casing, said shaft having a hydraulic fluid displacing radial vane thereon within said casing, said vane and said partition defining two generally arcuate chambers in the casing, port means connecting each of said chambers to said control valve in follow-up fashion, so that upon movement of said one member relative to the other in one direction the vane will displace fluid from one of the chambers to assist in returning the valve from a first shifted position toward neutral, and upon movement of said one member relative to the other in the other direction the vane will displace fluid from the other chamber to assist in returning the valve from a second shifted position toward neutral.

References Cited
UNITED STATES PATENTS

| | | | |
|---|---|---|---|
| 2,917,125 | 12/1959 | Donner et al. | 180—79.2 |
| 3,151,694 | 10/1964 | Rogers | 180—79.2 |
| 3,159,230 | 12/1964 | Gordon | 180—79.2 |

BENJAMIN HERSH, *Primary Examiner*

J. H. BRANNEN, *Assistant Examiner.*